Patented May 2, 1944

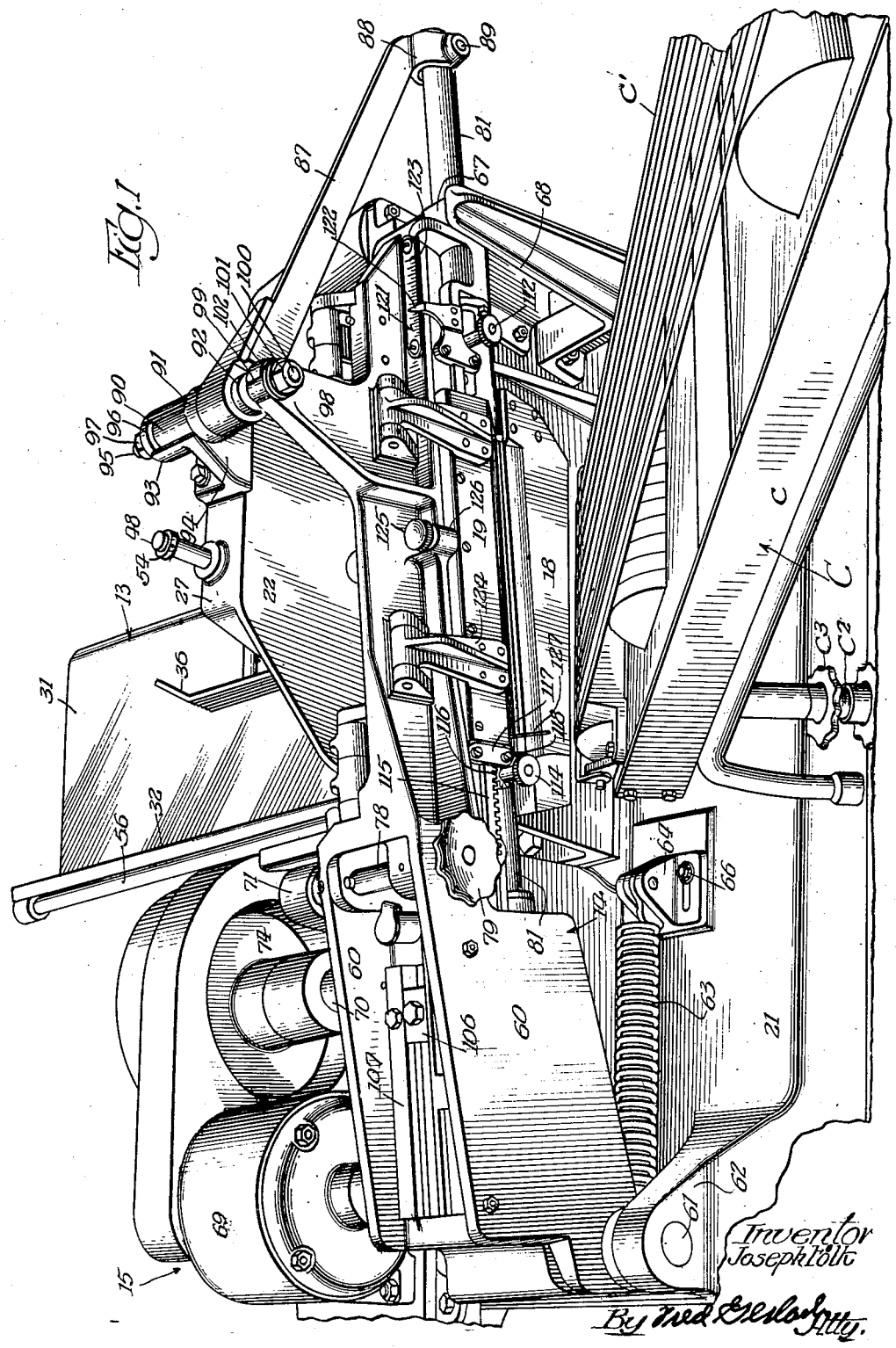

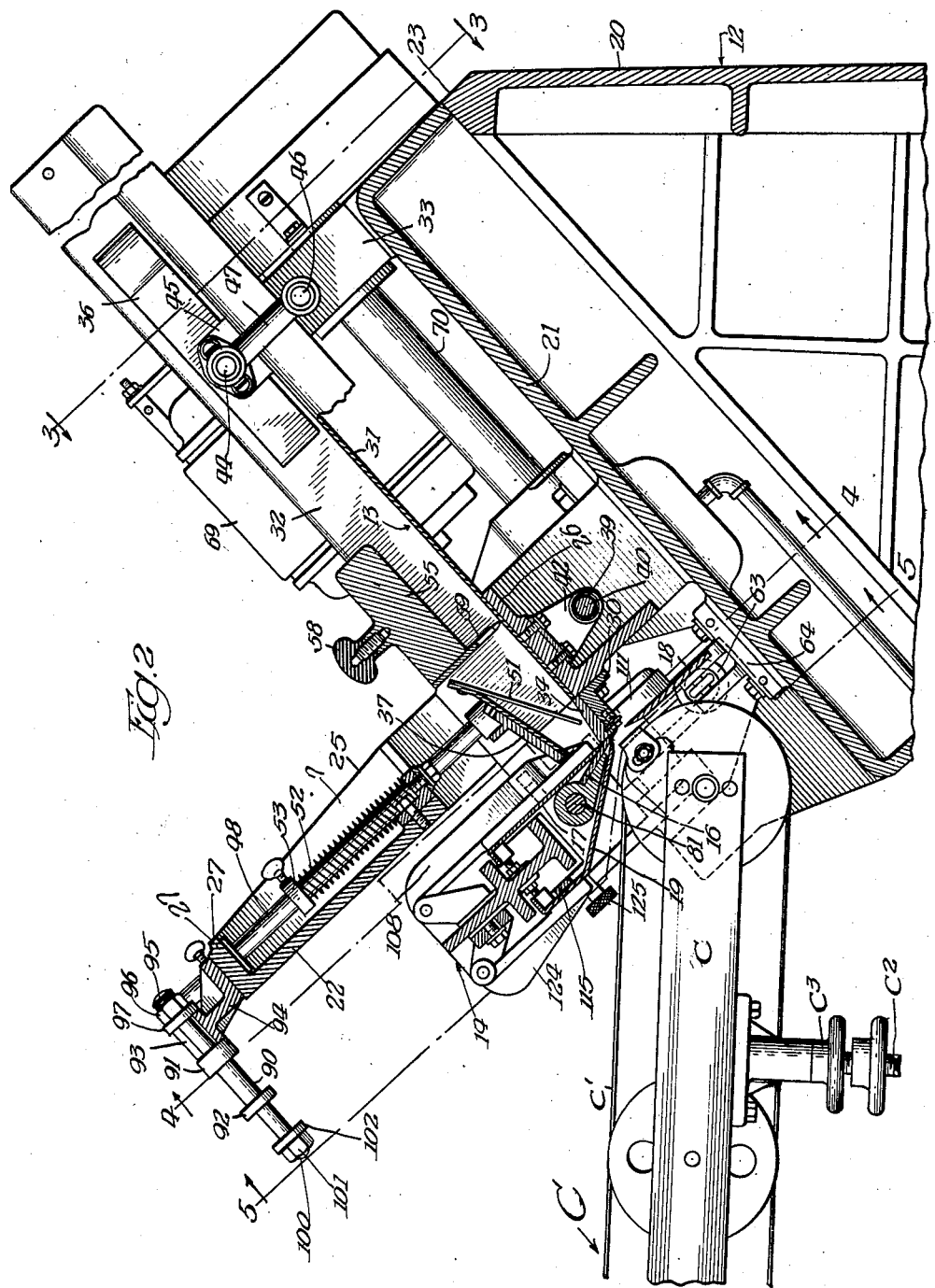

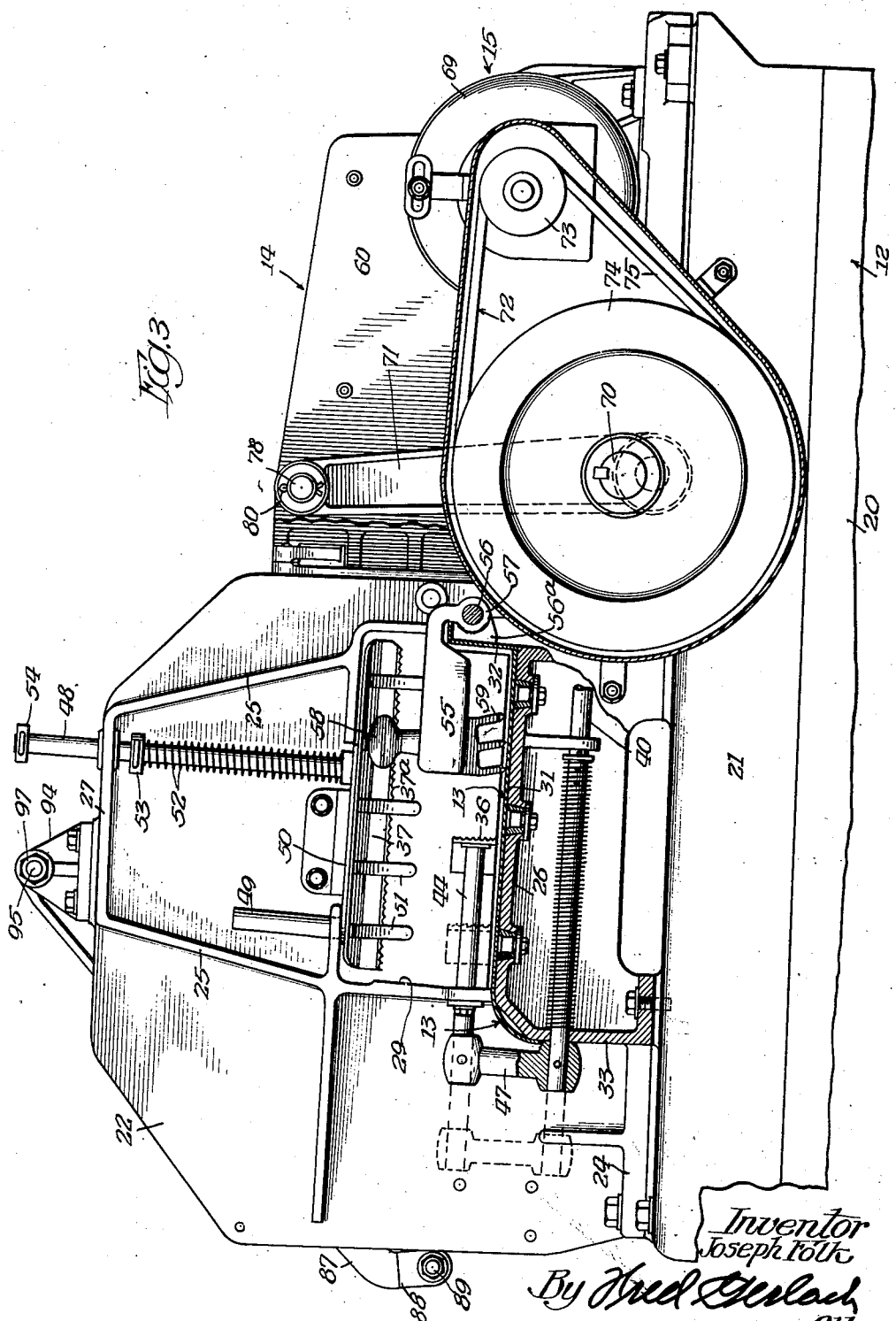

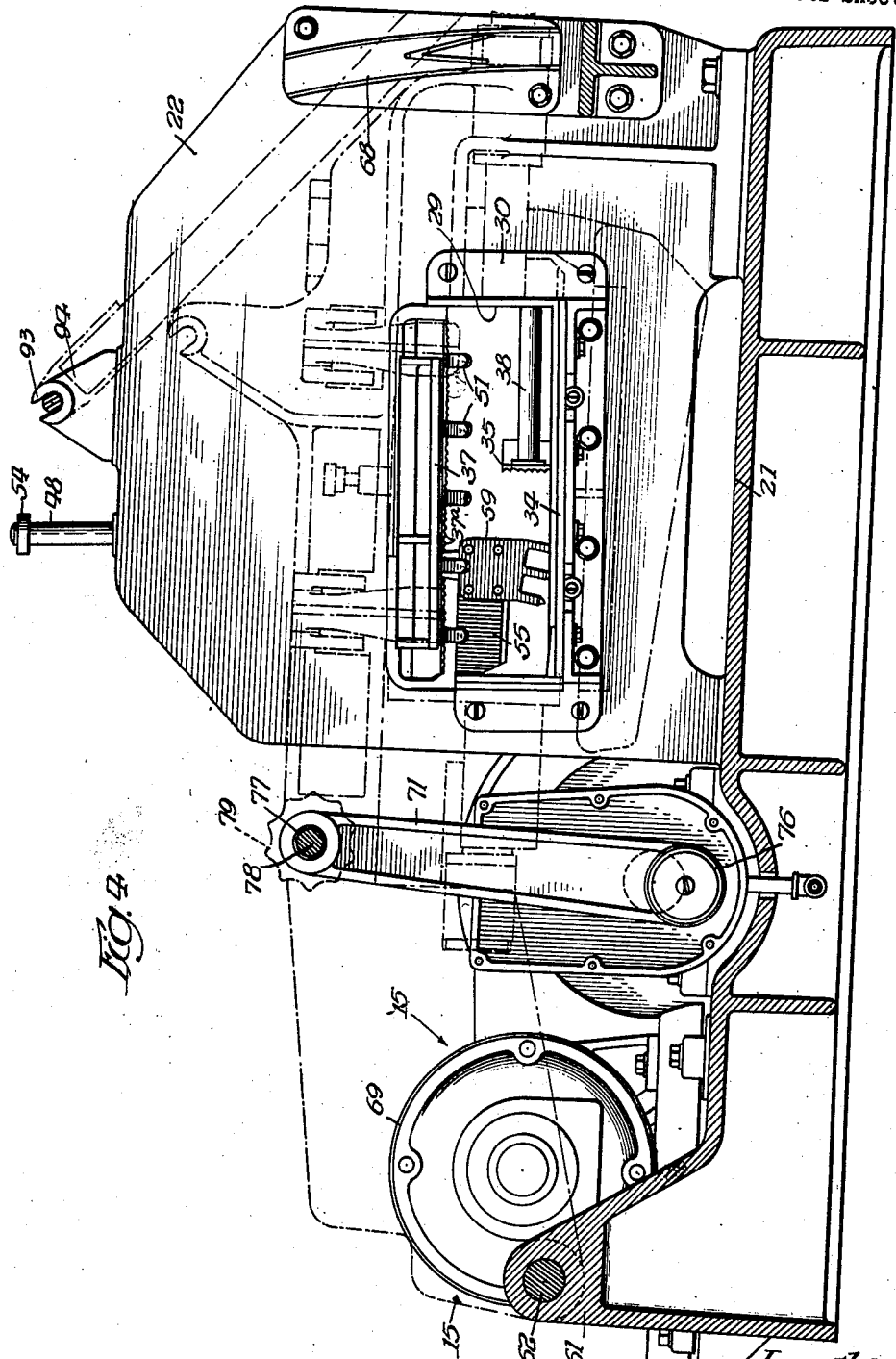

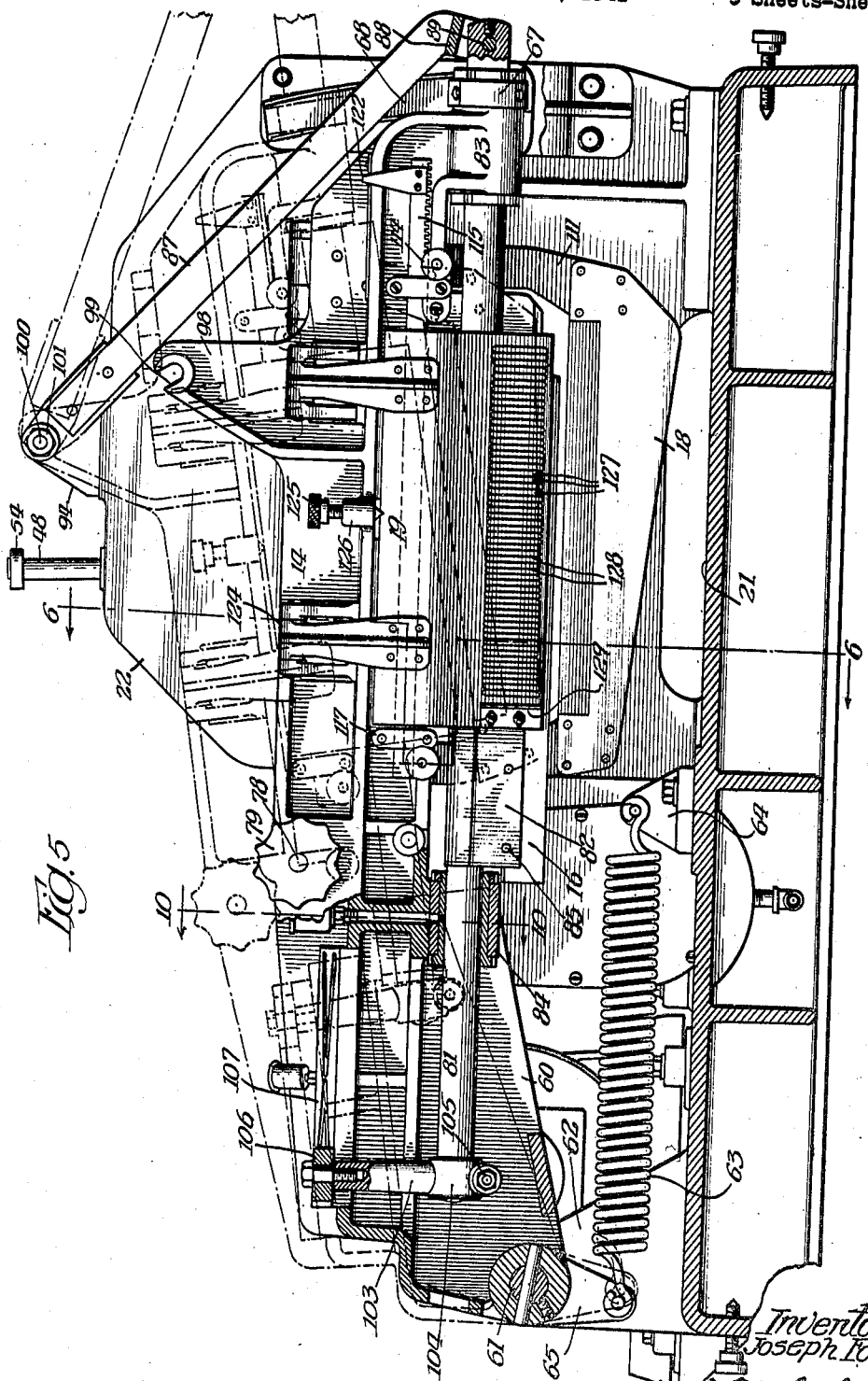

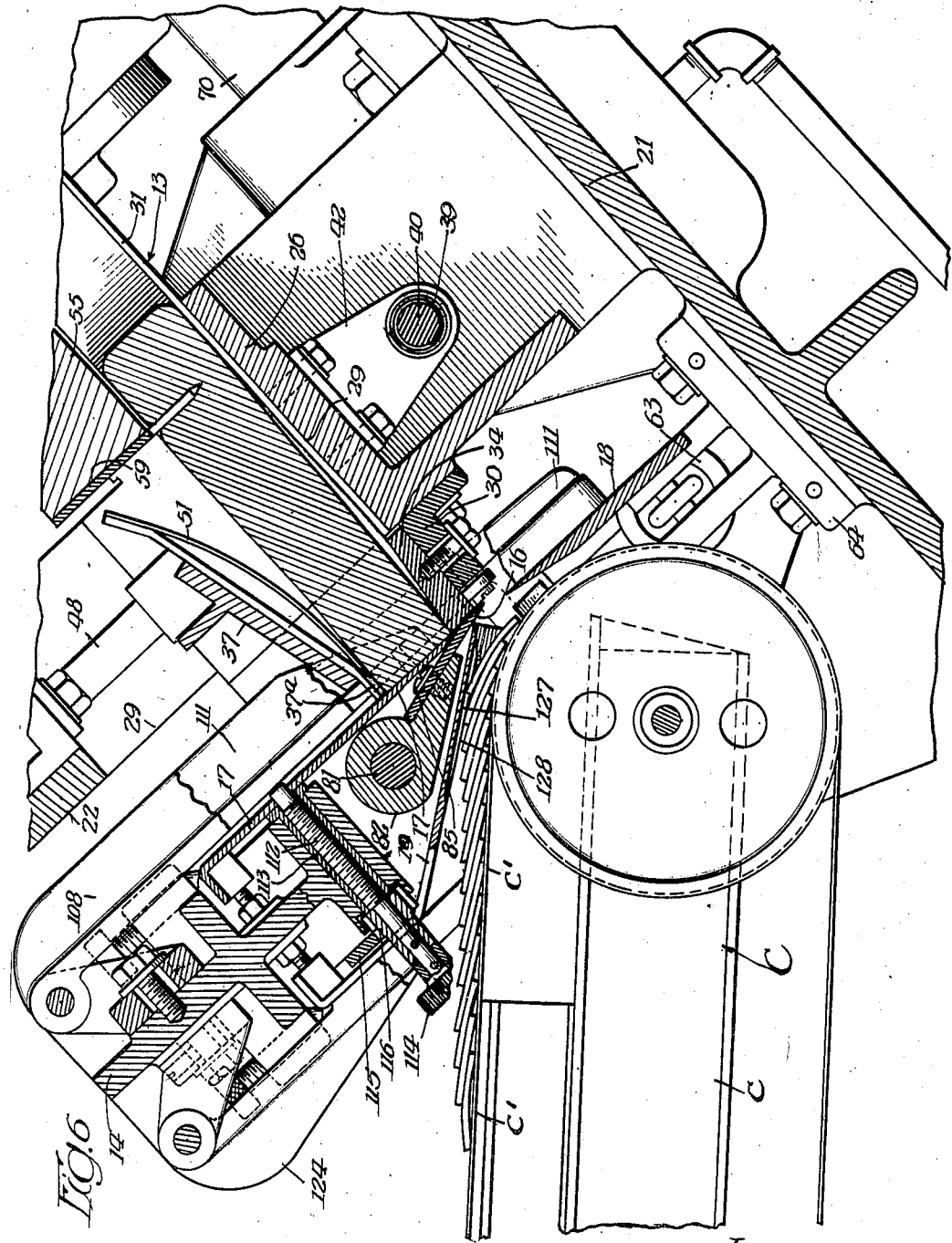

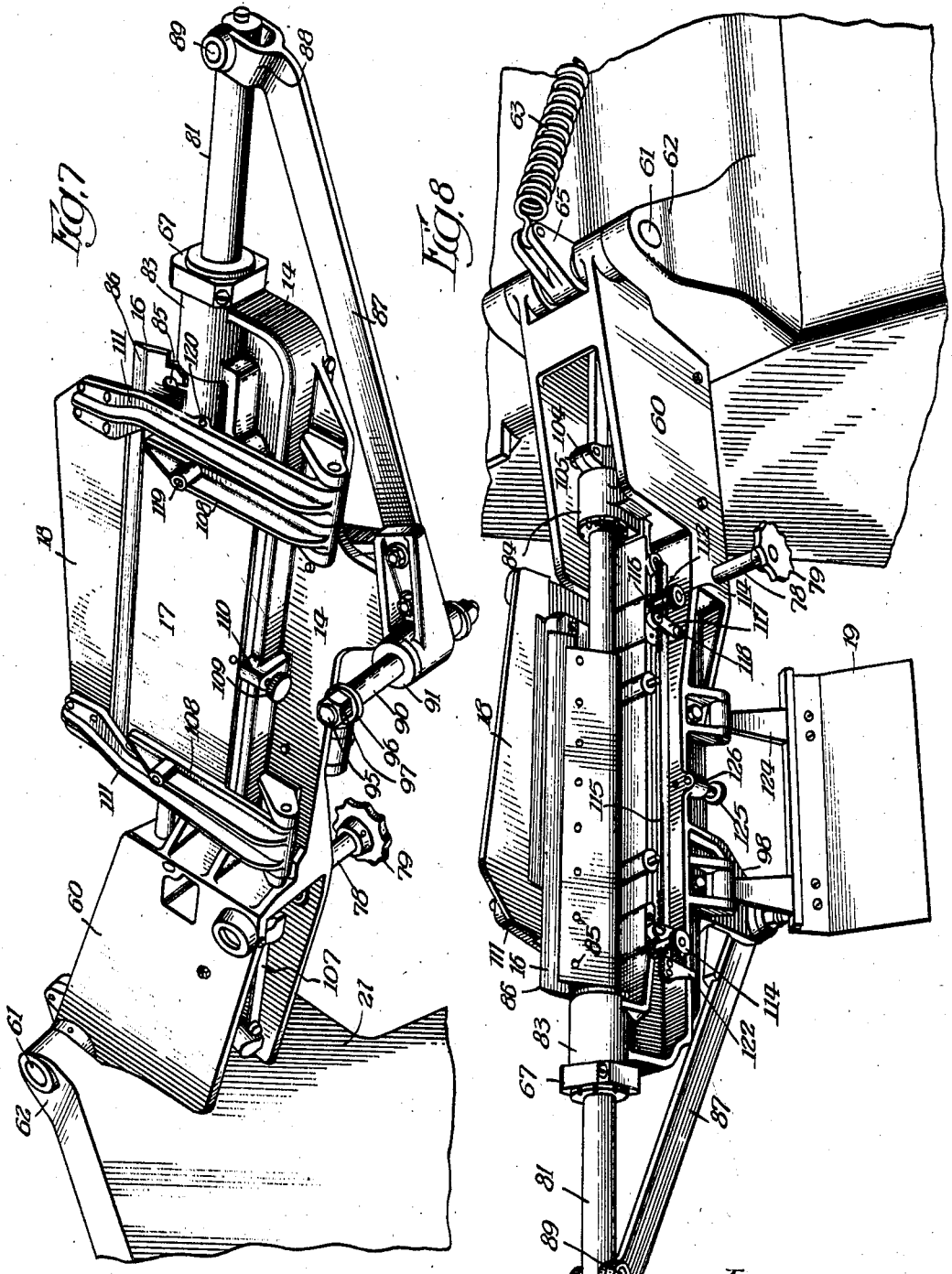

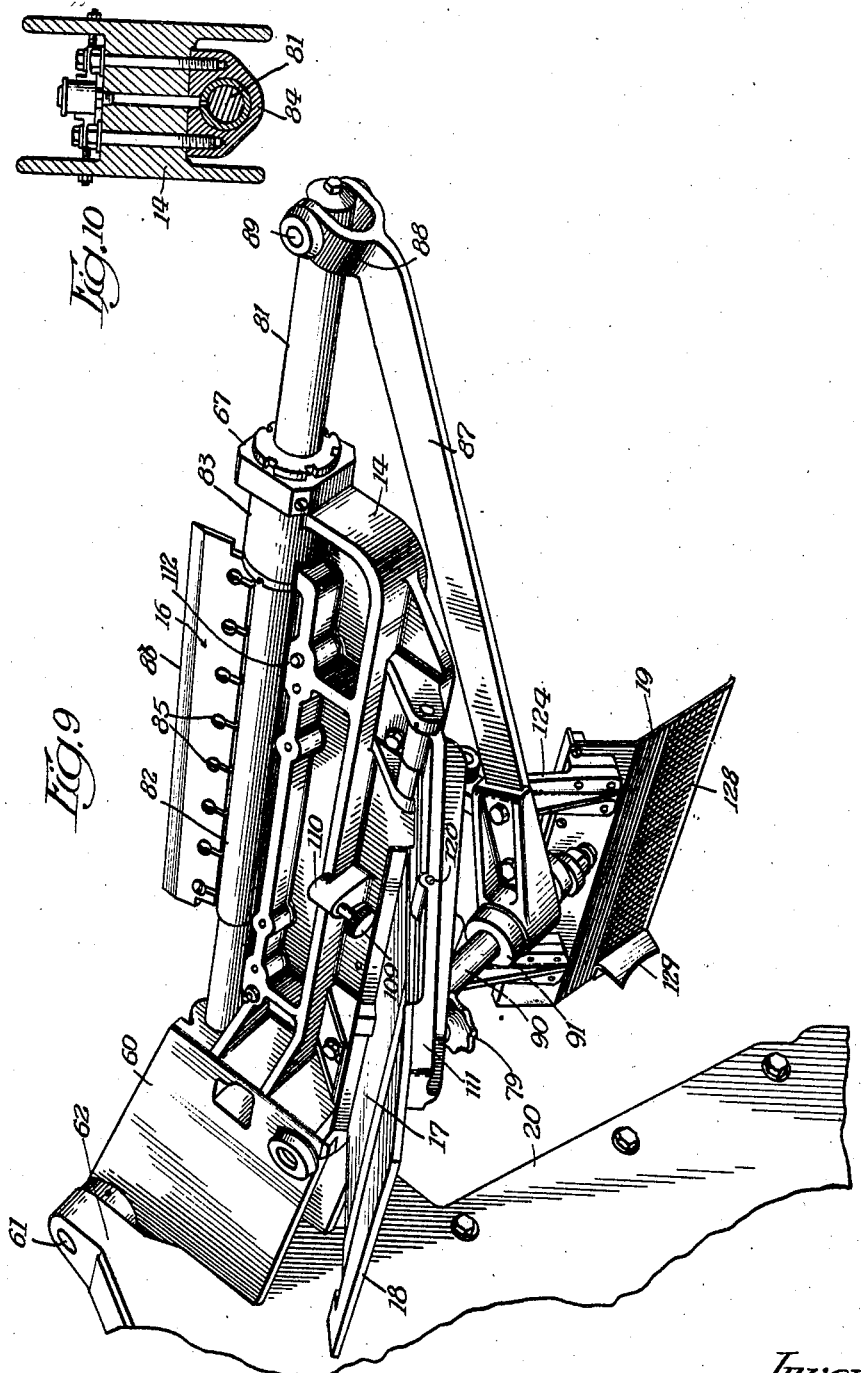

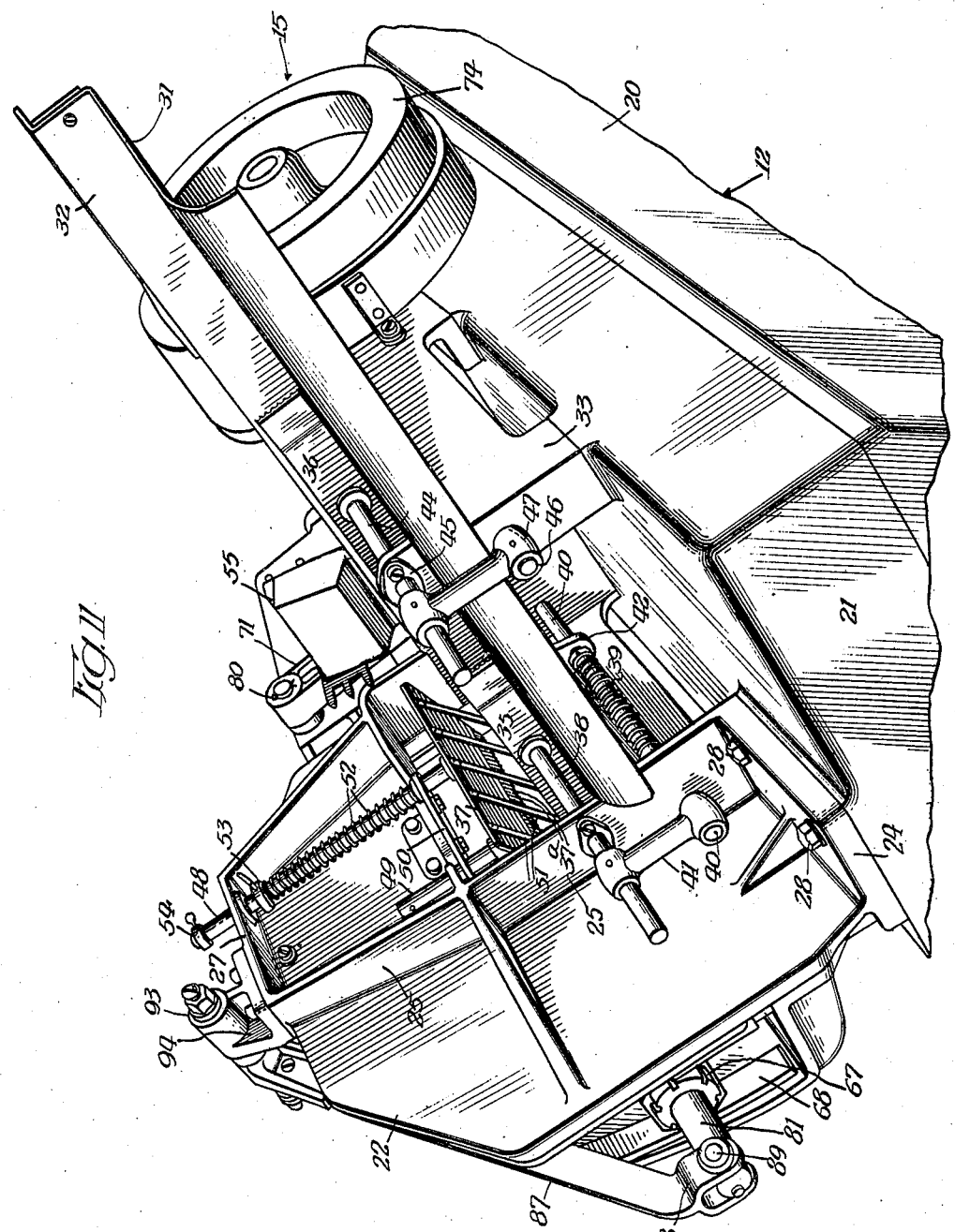

2,347,818

UNITED STATES PATENT OFFICE 2,347,818

SLICING MACHINE

Joseph Folk, Chicago, Ill., assignor to The Allbright-Nell Company, Chicago, Ill., a corporation of Illinois Application February 10, 1941, Serial No. 378,131

13 Claims. (Cl. 146—137)

The present invention relates generally to slicing machines. More particularly the invention relates to that type of machine which is designed primarily for use in a meat packing house or establishment, serves to slice frozen slabs of bacon into slices of uniform thickness and comprises as its principal parts or elements a supporting structure, a trough on the structure for feeding the slabs to be cut in a successive manner and a knife for slicing the slabs into slices as they move or are fed along the trough.

One object of the invention is to provide a slicing machine of this type which is an improvement upon, and has certain advantages over, previously designed bacon slicing machines and not only is more efficient in operation but also operates to cut the bacon more uniformly and without forming or causing so-called "strings" on the slices.

Another object of the invention is to provide a bacon slicing machine of the type under consideration in which the knife is in the form of a straight plate or bar, is mounted for longitudinal sliding movement on an oscillatory arm at the discharge end of the trough and is so controlled that it reciprocates in connection with oscillation of the arm.

Another object of the invention is to provide a slicing machine of the last mentioned character in which the oscillatory arm carries an adjustable gauge plate which is disposed adjacent the cutting edge of the knife and coacts with the latter to control the thickness of the slices.

Another object of the invention is to provide a bacon slicing machine of the type and character under consideration in which the knife and gauge plate carrying arm are arranged and designed so that at the conclusion of a slicing period it may be swung from a normal operative position adjacent the discharge end of the trough into an inoperative position wherein it is disposed at one side of the trough and the knife and gauge are readily accessible for cleaning.

Another object of the invention is to provide a slicing machine of the last mentioned character in which the oscillatory arm carries, in addition to the knife and gauge plate, a deflector plate for the cut slices and also an auxiliary gauge plate which overlies the cutting edge of the knife and prevents feed of the bacon slab being cut in the direction of the knife during the cutting stroke of the knife.

Another object of the invention is to provide a bacon slicing machine of the aforementioned type in which the auxiliary gauge plate, the main gauge plate and the deflector plate are hinged to the oscillatory arm so that when the latter is swung into its inoperative position at one side of the discharge end of the trough they may be swung away from the arm into a position wherein they are readily accessible for cleaning.

A further object of the invention is the provision in connection with a bacon slicing machine of the type and character under consideration, of a novel spring arrangement for balancing the knife carrying arm.

A still further object of the invention is to provide a bacon slicing machine which is generally of new and improved construction, may be operated with safety and in which adjustability of the operating parts is combined with durability and compactness of design.

Other objects of the invention and the various advantages and characteristics of the present slicing machine will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a front perspective of a bacon slicing machine embodying the invention;

Figure 2 is a vertical longitudinal section;

Figure 3 is a transverse section taken on the line 3—3 of Figure 2 and illustrating in detail the arrangement and design of the power means for oscillating the knife carrying arm and showing the arrangement of the inclined trough and the slab controlling means which is associated therewith;

Figure 4 is a transverse section taken on the line 4—4 of Figure 2 and showing the design and construction of the plate which is located at the lower end of the inclined trough and forms a part of the supporting structure of the machine;

Figure 5 is a section taken on the line 5—5 of Figure 2 and showing in detail the construction and design of the oscillatory arm and illustrating the manner in which the knife is reciprocated in connection with oscillation of the arm;

Figure 6 is an enlarged longitudinal section taken on the line 6—6 of Figure 5 and showing the arrangement and design of the knife, the main gauge plate and the auxiliary gauge plate;

Figure 7 is a perspective view showing the knife carrying arm after it has been swung into its inoperative position at one side of the discharge end of the trough;

Figure 8 is a perspective view showing the arm in its inoperative position and the deflector plate swung away from the arm into its inoperative position wherein it is accessible for cleaning;

Fig. 9 is a perspective view illustrating the arm in its inoperative position and showing the main gauge plate and the auxiliary gauge plate after they have been released and swung away from the arm so that they are accessible for cleaning and the knife is in a position wherein it may be cleaned as well as ground or otherwise sharpened;

Figure 10 is a section on the line 10—10 of Figure 5; and

Figure 11 is a rear perspective of the machine showing in detail the design and construction of the bacon controlling means on the feed trough.

The slicing machine which is shown in the drawings constitutes the preferred form or embodiment of the invention. It is designed for use in a meat packing establishment and serves, as hereinafter described, to slice bacon in the form of frozen slabs. As its main or principal parts the machine comprises a supporting structure 12, a feed trough 13, an oscillatory knife carrying arm 14, power means 15 for oscillating the arm, a knife 16, upper and lower gauge plates 17 and 18 and a deflector plate 19. These parts function or operate as hereinafter described and are so arranged and designed that the machine as a whole is in the form of a compact unit.

*Supporting structure*

The supporting structure 12 consists of a main frame 20, a bed plate 21 and a plate 22. The frame 20 is adapted to rest upon the floor of the meat packing establishment in which the machine is employed or used. It is preferably in the form of a casting and embodies at the top thereof a continuous marginal flange 23. The latter has a flat top face and this is disposed at an angle of 45° with respect to the horizontal, as shown in Figure 2. The bed plate 21 is in the form of a one-piece casting and embodies a depending marginal flange which rests upon and is bolted or otherwise fixedly secured to the marginal flange 23 at the top of the frame 20. The top face of the bed plate is flat and it also extends at a 45° angle with respect to the horizontal. The plate 22 is positioned at right angles to, and extends transversely across the central portion of, the bed plate 21. It is preferably in the form of a casting and embodies a pair of laterally spaced bottom flanges 24, a pair of laterally spaced side flanges 25, a transversely extending intermediate flange 26 and a top flange 27. These flanges project or extend in a rearwards direction, that is, toward the upper end of the bed plate 21. Bolts 28 extend through the bottom flanges 24 and the subjacent portion of the bed plate 21 and serve to hold the plate 22 in fixed relation with the bed plate. The side flanges 25 are positioned in laterally spaced relation and extend upwards from the inner ends or portions of the bottom flanges 24. The intermediate flange 26 is joined to, and extends between the lower central portions of, the side flanges and is located above the bottom flanges 24. The top flange 27 extends between, and is joined to, the upper ends of the two side flanges 25. A rectangular opening 29 is formed in the central portion of the plate 22 and this opening is located or positioned directly above the intermediate flange 26. As hereinafter described, the slabs of bacon to be cut are fed successively through the opening 29 and are sliced by the knife 16 as they pass through the opening. A U-shaped frame 30 is bolted to the front or downwardly facing face of the plate 22 and extends around the lower portion of the rectangular opening 29, as shown in Figure 4.

*Feed trough*

The trough 13 serves as the medium for feeding the bacon slabs to be cut through the rectangular opening 29 in the plate 22 for slicing by the knife 16. It overlies the upper portion of the bed plate 21 and consists of a bottom wall 31 and a side wall 32. The bottom wall is downwardly inclined at an angle of 45°. It embodies a flat top face and is adapted to have the bacon slabs to be cut slide down it by gravity. The lower or discharge end of the bottom wall 31 of the trough rests upon and is bolted or otherwise fixedly secured to the intermediate flange 26 of the plate 22. The rear or upper portion of the bottom wall is supported by way of a bracket 33 which extends between it and the bed plate 21. The side wall 32 of the trough is joined to, and projects upwardly from, one of the side margins of the bottom wall 31. It extends at right angles to the bottom wall and serves as a guide along which the bacon slabs slide. The trough is downwardly and laterally tilted in the direction of the side wall 32 in order that the slabs gravitate or slide laterally into contact or engagement with the side wall. A shearing bar 34 is located at the lower edge, and forms a continuation, of the bottom wall 31 of the trough. This bar is bolted to the bottom portion of the U-shaped frame 30. The bottom or lower portion of this bar constitutes a shearing edge, and the knife 16, as hereinafter described, moves across or traverses this edge and coacts therewith to effect slicing of the bacon. As shown in Figure 6, the shearing edge at the bottom of the shearing bar 34 is upwardly offset with respect to the plane of the top face of the bottom wall 31 of the trough with the result that the slab of bacon which is being cut or sliced by the knife 16 engages the bottom wall of the trough only at its rear end and hence feeds or slides readily down the trough.

The trough is of sufficient length so that the slabs of bacon to be cut may be placed thereon in series form for successive gravity feed to the knife. Associated with the trough are three bacon controlling shoes 35, 36 and 37. The shoes 35 and 36 overlie the bottom wall 31 of the trough 13 and serve to urge or hold the slabs in sliding engagement with the side wall 32. The shoe 35 is disposed over the lower or discharge end of the said bottom wall 31 and is carried for horizontal sliding movement in the direction of the side wall by way of a rod 38. The latter extends through a hole in one of the side flanges 25 of the plate 22 and is positioned in parallel relation with the bottom wall 31 of the trough. A compression spring 39 serves to urge the shoe 35 in the direction of the side wall 32. This spring is applied to, and extends around, a horizontal axially slidable rod 40 which underlies the intermediate flange 26 of the plate 22 and has one end thereof connected to the outer end of the rod 38 by way of an arm 41. One end of the rod 40 is slidably mounted in a hole in the lower end of one of the side flanges 25 and the other end of the rod is slidably mounted in a hole in a bracket 42 (see Figure 11). The spring 39 extends between the hole equipped side flange of the plate 22 and a shoulder forming washer (not shown) on the rod 40 and urges the rod together with the rod 38 and the shoe 35 in the direction of the side wall 32. The shoe 36 is located over the central portion of the bottom wall 31 of the trough and is mounted for horizontal sliding movement to and from the side wall 32 by way of a rod 44. The latter is disposed in parallel relation with the rod 38 for the shoe 35 and is slidably mounted in a bracket 45 on the trough bottom wall 31. The shoe 36 is urged in the direction of the side wall 32 by way of a spiral compression spring which is mounted on a horizontally extending axially slidable rod 46 and functions similarly to the spring 39. The rod 46 is slidably mounted in the bracket 33 that supports the upper or charging end of the trough and is connected to the outer end of the rod 45 by way of an arm 47. The portions of the shoes 35 and 36 which extend in the direction of the upper end of the trough are angled or inclined away from the side wall 32 and serve as cam means whereby the shoes are urged away from the side wall in connection with feed of the slabs to be cut down the trough. When the trough is charged with slabs the shoes 35 and 36 urge the slabs against the side wall 32 of the trough and hence control the feed of the slabs in the direction of the shearing bar 34. When a bacon slab to be cut is placed on the upper portion of the trough and is then released it slides downward until it engages the upper portion of the shoe 35 and then slides downwards past the shoe and against the side wall 32. The springs for urging the shoes 35 and 36 towards the side wall are lightly loaded in order that the shoes do not impede or retard sliding movement of the slabs down the trough. The faces of the shoes that are opposite to the side wall 32 are longitudinally grooved or flued for friction reducing purposes. The arms 41 and 47 limit movement of the shoes 35 and 36 in the direction of the side wall 32. The shoe 37 overlies the shearing bar 34 and operates to press downwards against the bar the bacon slab that is being subjected to the slicing action of the knife 16. It is positioned in parallel relation with the bar and is mounted for movement to and from the bar by way of a pair of laterally spaced upstanding rods 48 and 49. The lower end of the rod 49 extends through and is slidably mounted in a hole in a lug supported plate 50 and the upper end of the rod extends through and is slidably mounted in a hole in the top flange 27 of the plate 22. The rod 48 is parallel to the rod 49 and is slidably mounted in a hole in the plate 50. The shoe 37 moves by gravity in the direction of the shearing bar 34 and embodies a series of laterally spaced spring fingers 51 on the bottom face thereof. A light compression spring 52 surrounds the rod 48 and is arranged so that it urges the shoe 37 upwards and thus facilitates passage of the slabs between the shoe and the shearing bar 34. The loading of the spring is not sufficient to overcome the weight of the shoe 37 and hence the shoe, through the medium of the spring fingers 51, engages the subjacent slab with light downward pressure. The lower end of the spring 52 abuts against the plate 50 and the upper end of the spring abuts against a collar 53 on the rod 48. A second collar 54 at the upper extremity of the rod 48 coacts with the collar 53 to limit movement of the shoe 37 to and from the shearing bar 34. The lower ends of the spring fingers 51 terminate inwardly of the lower portion of the shoe 37 and such portion of the shoe directly overlies and is aligned with the lower cutting portion of the bar 34 and is transversely fluted (see Figure 4) in order to form depending teeth 37ª. The latter serve to hold the bacon slab being cut against lateral displacement while at the same time they permit the slab to feed downwards across the shearing bar 34 without undue frictional retardation. By employing the vertically slidable shoe 37 it is possible to obtain continuous feeding of the slabs to the knife. Furthermore, there is no likelihood of the slab being cut moving with the knife after it has been substantially completely sliced and there is only a small piece or part remaining.

Also associated with the trough 13 is a follower block 55. This block is mounted to slide lengthwise of the trough and is normally positioned inwards of the trough side wall 32, as shown in Figure 4. It is mounted on a rod 56 and when in use operates to urge the slab of bacon being sliced or cut towards the shearing bar 34. The rod 56 is supported alongside of and has its lower end mounted in a socketed boss 56ª on the plate 22 of the supporting structure 12. The block 55 embodies at the outer portion thereof a sleeve 57 which fits loosely around the rod 56. The sleeve and rod guide the block for rectilinear sliding movement. The sleeve is so designed or arranged that it permits the block to be swung to one side of the trough when it is not in use. The block embodies a handle 58 and a fork 59. The fork is adapted, in connection with certain use of the block, to penetrate the subjacent slab of bacon and when in penetrating or operative position it serves to connect the block to the slab. The handle 58 permits the block to be raised or otherwise manipulated by the operator of the machine. In using the block the block is moved upwards manually and is then swung into forked relation with a bacon slab on the trough. As soon as the block is released it slides downwards together with the slab and assists gravity feed of the slab toward the knife 16. The sleeve 57 coacts with the socketed boss 56ª on the plate 22 to limit downward movement of the follower block 55. At the end of downward movement of the block the sleeve 57 strikes against said side flange and thus arrests the block and prevents any further feed of the impaled slab past the shearing bar 34. In the event that there are two more slabs of bacon on the trough 13 and the operator desires to slice but one slab the follower block 55 is swung over the trough and is positioned in such manner that the fork 59 is disposed between the abutting ends of the lowermost and next lowermost slabs. As soon as the block slides downwards to its fullest extent it arrests further feed movement of the uncut slabs while at the same time it permits a full or unrestricted feed of the slab being cut.

*Knife carrying arm*

The arm 14 is positioned adjacent, and extends transversely across, the discharge or lower end of the trough 13. It is positioned beneath the plate 22 of the supporting structure 12 and carries or supports the knife 16, as hereinafter described. Preferably the arm is in the form of a casting. The inner or proximal end of the arm comprises a pair of members 60. These members, as best shown in Figure 1, are arranged in laterally spaced relation and are parallel to one another. The arm 14 is pivotally mounted by way of a pivot pin 61 which is carried by a pair of laterally spaced ears 62 on the bed plate 21 of the supporting structure 12 and extends through aligned or coaxial holes in the members 60 of the arm. The ears are located at one side of the bed plate and carry the pin so that it extends at a 45° angle with respect to the horizontal. When the arm is in its normal or operative position the distal end thereof extends across the rectangular opening 29 in the plate 22 (see Figures 1, 2, 5 and 6). As hereinafter described, the power means is adapted during drive thereof and while the arm 14 is in its operative position rapidly to oscillate the arm. When the machine is not in use the arm may be swung from its normal operative position into an inoperative position wherein it is disposed at one side of the bed plate 21 of the supporting structure, as shown in Figures 7, 8 and 9. In order to balance the arm and thus reduce the power input an elongated helical type tension spring 63 is provided. This spring underlies the arm members 60 when the arm is in its operative position and has one end thereof anchored to a bracket 64. The other end of the spring is anchored to a lug 65 which extends between, and is secured to, the arm members 60. As shown in Figure 5, the lug 65 projects radially with respect to the pivot pin 61 and extends at right angles to the arm. When the arm is in its operative position the lug 65 faces or extends downward. The bracket 64 is connected by a bolt and slot connection 66 to the lower portion of the bed plate 21 in order that it may be shifted to effect adjustment of the tension spring. The spring is preferably so tensioned that it truly balances the knife carrying arm 14. When the arm is swung into its inoperative position at one side of the bed plate the lug 65 swings throughout an arc of substantially 180° into a position wherein it projects upwards. In such position the spring serves to counterbalance the arm. Due to the specific arrangement of the lug the tension spring 63 facilitates movement or swinging of the arm into its inoperative position. In order to prevent the distal end of the 14 from wobbling or moving laterally in connection with oscillation of the arm a shoe 67 and a pair of guide plates 68 are provided. The shoe 67 is mounted on, and fixed to, the distal end of the arm 14 and has flat sides, as shown in Figure 5. The guide plates 68 are positioned in laterally spaced relation and extend upwards. They have flat inner guide surfaces and are bolted or otherwise fixedly secured to the plate 22 of the supporting structure 12. The shoe is adapted to slide between the inner flat guide surfaces of the guide plates in connection with oscillation of the arm. When the arm is swung into its inoperative position the shoe slides out of engagement with the plates.

Arm oscillating means

The means 15 for oscillating the arm while the latter is in its operative position comprises an electric motor 69, a crank shaft 70 and a connecting rod 71. The motor 69 is located at one side of the trough 13 and is fixed to the rear or upper portion of the bed plate 21. It is connected to, and operates to drive, the crank shaft 70 by way of a belt and pulley connection 72. The latter consists of a pulley 73 on one end of the armature shaft of the motor, a pulley 74 on the crank shaft, and an endless belt 75 around the two pulleys. The crank shaft is positioned in parallel relation with the armature shaft of the motor and both of these shafts extend at an angle of 45° with respect to the horizontal. Said crank shaft is journalled in suitable bearing brackets on the bed plate of the supporting structure and embodies at its lower end a crank 76. The connecting rod 71 is positioned in an upstanding manner and has the lower end thereof pivotally connected to the crank 76. The upper end of the rod is provided with a circular hole 77 and is pivotally connected to the upper inner portions of the arm members 60 by a pivot pin 78. The latter is arranged in parallel relation with the pivot pin 61, as shown in Figure 1, and extends through aligned holes in the members 60. One end of the pin is provided with a handle 79 and the other end of the pin fits within the hole 77 in the upper end of the connecting rod 71. A cotter pin 80 extends through the outer extremity of the pin 78 and serves when in place to hold the pin from axial displacement. When the cotter pin is removed the pin 78 may be slid axially out of the hole 77 in order to free the arm from the connecting rod and thus permit it to be swung into its inoperative position. The handle 79 enables the operator for the machine readily to remove the pin 78 upon release or withdrawal of the cotter pin. When the connecting rod 71 is connected to the arm by way of the pin 78 and the motor 69 is in operation the motor operates through the medium of the belt and pulley connection 72 to drive the crank shaft 70 and the latter in turn operates through the medium of the connecting rod to oscillate the knife carrying arm 14.

Slicing knife

The knife 16 constitutes the cutting or slicing medium of the machine. It is in the form of a straight elongated blade and is carried for longitudinal sliding movement by means of a shaft 81. The latter underlies and extends parallel to the oscillatory arm 14 and embodies a lug equipped sleeve 82 on its central portion. The outer end of the shaft 81 is slidably mounted in a bearing 83 on the distal end of the arm 14. The other or inner end of the shaft is slidably mounted in a bearing 84 which is located between the inner portions of the laterally spaced members 60 of the arm. The sleeve 82 is pinned, keyed or otherwise fixedly secured to the shaft and is located adjacent the rectangular opening 29 in the plate 22 of the supporting structure when the arm 14 is in its operative position. The knife 16 is secured to the lug of the sleeve by way of screws 85 and extends parallel to the shaft. It embodies along the bottom portion thereof a cutting edge 86 and this edge, as shown in Figure 6, is substantially coplanar with the cutting edge of the bar 34 and coacts with the last mentioned edge during oscillation of the arm 14 to effect slicing of the slabs of bacon on the trough 13. When the arm is oscillated the knife 16 moves up and down past the shearing bar 34 and slices the bacon slabs as the latter move successively through the opening 29 in the plate 22. The slicing occurs on the down stroke of the knife and the bacon is fed downwards on the upstroke of the knife. The cutting edge 86 of the knife extends truly radially with respect to the axis or center of the pivot pin 61 and is so arranged with respect to the shearing bar 34 that it is parallel to the edge of the bar at the instant that it passes the shearing edge of the bar on the down stroke of the arm 14. Due to the parallel arrangement of the cutting edge 86 and the shearing edge of the bar 34 at the instant the former passes the latter the bottom portion of the bacon slab being cut or sliced is uniformly or completely severed at a certain point during the down stroke of the knife. In other words, due to the aforementioned parallel arrangement the entire bottom edge of each slice is severed from the slab being cut at the instant the cutting edge of the knife passes into lapped relation with the shearing edge of the bar 34. A link 87 serves to reciprocate the knife during oscillation thereof by the arm 14. One end of this link is pivotally connected to the outer end of the shaft 81 by way of a yoke 88 and a pivot pin 89. The yoke 88 is formed as an integral part of said one end of the link and straddles the outer end of the shaft. The pivot pin 89 is carried by the yoke and extends through a transverse hole in said outer end of the shaft. The other end of the link 87 embodies a circular hole through which a pivot pin 90 extends. A pair of laterally spaced collars 91 and 92 on the central portion of the pivot pin 90 serve to hold the pin against axial displacement with respect to the link 87. One end of the pivot pin is adapted to fit within a U-shaped member 93 on a bracket 94 and has a threaded stem 95 on which are mounted a washer 96 and a nut 97. The bracket 94 is bolted to the top flange 27 of the plate 22, as shown in Figure 1. Said one end of the pivot pin 90 is adapted to be clamped within the U-shaped member 93 by way of the nut 97. When the pivot pin is in place in the member 93 and the nut 97 is tightened the U-shaped member is clamped between the collar 91 and the washer 96 and there is a fixed or rigid connection between the pin and the bracket. The link 87 extends upwardly and inwardly from the outer end of the knife carrying shaft 81. When the pin 90 is in fixed relation with the bracket 94 and the arm 14 is oscillated the link 87 operates on the up stroke of the arm to slide the shaft and knife in one direction and on the down stroke of the arm to slide the shaft and knife in the opposite direction. The arrangement of the link is such that the knife is caused to move inwards, that is, in the direction of the pivot pin 61 for the arm 14 on the down stroke of the arm and is caused to move outwards, that is, in the opposite direction, on the up stroke of the arm. In connection with swinging of the arm 14 into its inoperative position the pin 90 is released from the U-shaped member 93 on the bracket 94 by loosening the nut 97. As soon as the nut is loosened the pin is free so that it may be swung out of seated relation with the member 93. The link 87 together with the pivot pin 90 and the bracket 94 constitutes simple means for effecting reciprocation of the knife in connection with oscillation of the arm 14.

In order to support the link 87 and hold it against movement when the arm 14 is in its inoperative position a supporting bracket 98 is provided. This bracket is formed as a part of, and extends upwardly from, the distal end of the main oscillatory arm 14. It is disposed inwardly of the bearing 83 and has in the upper portion thereof an open top seat 99 for the other end of the pivot pin 90, that is, the end that is remote from the nut carrying threaded stem 97. Said other end of the pivot pin embodies a threaded stem 100 on which are mounted a nut 101 and a washer 102. When said other end of the pivot pin is disposed in the seat 99 and the nut 101 is tightened the bracket 98 is clamped between the washer 102 and the collar 92 and the pin is thus held in rigid or fixed relation with the bracket. When it is desired to swing the knife carrying arm into its inoperative position the pulley 74 is turned manually until the arm 14 is swung upwards a sufficient distance to cause the pivot pin 90 to seat within the seat 99. Thereafter the nut 101 is tightened so as to lock the pivot pin to the bracket 98. As soon as the pivot pin is locked to the bracket the nut 96 is loosened so as to free the upper end of the pivot pin from the U-shaped member 93 on the bracket 94. After loosening of the nut 96 and upon removal of the pivot pin 78 the arm 14 is so freed that it may be swung bodily into its inoperative position. When the arm is in its inoperative position and the link 87 is locked to the arm by way of the pivot pin 90 and the bracket 98, the knife is locked against sliding movement with respect to the arm and hence may be readily sharpened. Under normal operating conditions the pivot pin 90 is clamped to the bracket 94 and is disconnected from the bracket 98. Should it be desired to lock the arm 14 to the supporting structure when the machine is not in use the pivot pin 90 is connected to the bracket 98 while it is in connected relation with the bracket 94. The bracket 98 and the pivot pin 90 constitute simple means for locking the link 87 and the knife to the arm when the arm is in its operative position. They further constitute means for locking the arm 14 to the supporting structure when the machine is not in use. Should an attempt be made to start the machine while the arm 14 is locked to the supporting structure through the medium of the brackets 94 and 98 and the pivot pin 90 the current to the electric motor 69 is automatically cut off due to break or rupture of the usual fuse in the motor circuit.

The knife carrying shaft 81 is held against turning or rotative movement during normal operation of the machine by way of an upstanding arm 103 which is disposed between the laterally spaced members 60 of the main arm 14 and has its lower end connected to the inner end of the shaft 81 by way of a split collar 104. A bolt 105 serves to contract the collar 104 into clamped relation with the shaft 81. The upper end of the arm 103 is provided with a shoe 106 and this shoe is disposed and slidable between a pair of laterally spaced parallel guide plates 107 on the upper portions of the members 60. When the shaft 81 is reciprocated in connection with a slicing operation the shoe 106 slides back and forth between the plates 107. By reason of the fact that the shoe 106 is held by the guide plates against lateral displacement the knife carrying shaft 81 is precluded from turning during normal operation of the machine. The shaft may however be rotatively adjusted in order to bring the cutting edge 86 of the knife 16 into proper relation with the cutting edge of the bar 34. To effect rotative adjustment of the knife it is only necessary to release the bolt 105 and then turn the shaft 81 relatively to the split collar 104. After proper rotative adjustment of the knife the bolt 105 is tightened in order rigidly to connect the shaft to the shoe carrying arm 103. The collar equipped arm 103, the shoe 106 and the guide plates 107 constitute simple means for preventing turning of the knife during reciprocation of the latter, and the split collar 104 at the lower end of the arm 103 constitutes simple means for permitting rotative adjustment of the knife.

Upper and lower gauge plates

The upper gauge plate 17 is in the nature of an auxiliary gauge plate and overlies the knife 16. It is in the form of a flat plate and is connected to the central portion of the main knife carrying arm 14 by way of a pair of hinges 108. The latter are located at the ends of the gauge plate 17 and permit the plate to be swung away from the arm 14 into an open cleaning position when the arm is in its inoperative position (see Figure 9). A thumb screw 109 serves as a medium for releasably locking the gauge plate 17 in its normal or operative position. This screw extends through a lug 110 on the central portion of the arm and when tightened bears against the upper margin of the gauge plate and clamps such plate in its operative or normal position. When the screw 109 is released or loosened the plate 17 is released and hence may be swung away from the arm 14 for cleaning purposes, as hereinbefore described. When the machine is in use the bottom margin of the plate 17 terminates immediately above the cutting edge 86 of the knife 16 and serves as a stop whereby feed of the bacon slab being cut is prevented during the down or cutting stroke of the knife. The plate 17 is located on the side of the arm 14 that is opposite the bottom face of the plate 22 of the supporting structure 12. It is rectangular as far as the contour or shape is concerned and is approximately the same size as the opening 29 in the plate 22. The bottom edge of the plate 17 is bevelled, as shown in Figures 2 and 6. On the down stroke of the arm 14 the gauge plate 17 engages and moves downwards past the sliced face of the bacon slab that is being cut and in this manner prevents downward feed of the slab. On the up stroke of the arm 14 the gauge plate 17 and the knife 16 move upwards past the slab and hence permit the slab to feed downwards into a position wherein a portion overhangs the shearing bar 34 and is in readiness for slicing.

The lower gauge plate 18 is located directly beneath the cutting edge 86 of the knife 16 and is connected to the central portion of the main knife carrying arm 14 by way of a pair of hinges 111. The latter are disposed outwards of the hinges 108 and permit the gauge plate 18 to be swung away from the arm 14 into a cleaning position when the arm is in its inoperative position. As shown in Figure 6, the gauge plate 18 is laterally offset with respect to the knife 16. On the up stroke of the arm 14 the plate 18 moves upwards past the shearing bar 34. As soon as the knife moves out of contact with the slab being cut in connection with the up stroke of the arm the slab moves downwards until it strikes against the gauge plate 18. The depth of cut, that is, the thickness of the slices, is determined by the amount of offset of the gauge plate with respect to the knife. By reason of the fact that the plate 18 is connected to the arm by hinges 111 the plate may be moved or adjusted in a lateral direction towards or away from the knife in order to vary the thickness of the slices. For the purpose of adjusting the lower gauge plate 18 a pair of screws 112 is provided. These screws extend through internally threaded bushings 113 in the central portion of the knife carrying arm 14. As shown in Figure 6, the bushings 113 extend at an angle of 45° with respect to the horizontal and are suitably held against axial displacement. The upper ends of the screws project past the upper ends of the bushings and bear or abut against the central portions of the hinges 111. The lower ends of the screws project beyond the lower ends of the bushings and are provided with knurled heads 114 in order that the screws may be turned. When the screws are turned so that they move upwards the gauge plate 18 is caused to move toward the knife 16. When the gauge plate is in close proximity to the knife the slices are extremely thin. When the adjusting screws 112 are turned in the opposite direction so that they move downwards the gauge plate 18 swings away from the knife 16 and hence coacts with the knife to form thick slices. The two adjusting screws are connected together for conjoint rotation by way of a rack 115 and a pair of pinions 116. The rack extends lengthwise of the arm 14 and is mounted for longitudinal sliding movement by way of a pair of brackets 117. These brackets are secured to the arm 14 by screws 118. The pinions 116 are fixed to the lower ends of the adjusting screws and mesh with the teeth of the rack. When the gauge plates 17 and 18 are in their operative position the hinges 111 are held in contact with the upper ends of the adjusting screws by way of spring pressed plungers 119. These plungers are mounted in sockets in the hinges 108 and bear against transversely extending pins 120 on the central portions of the hinges 111. For the purposes of ascertaining the depth of cut, that is, the thickness of the slices, a gauge 121 is provided. This gauge consists of a pointer 122 on the rack 115, and a scale 123 on the arm 14.

Deflector plate

The deflector plate 19 is positioned adjacent the bottom face of the knife 16 and serves to strip the slices from the knife and direct them downwards onto a ribbon conveyor C. The latter consists of a frame c and a plurality of endless laterally spaced sheave or roller supported ribbons $c^1$. The receiving end of the conveyor is disposed directly beneath the shearing bar 34, as best shown in Figure 6. It is vertically adjustable to and from the shearing bar by way of a rotatable upstanding screw-type rod $c^2$. The upper end of this rod fits within an internally threaded socket in the frame (see Figure 2). When the rod is turned or rotated in one direction the receiving end of the conveyor is elevated whereas when the rod is reversely rotated the conveyor is caused to move downwards. A lock nut $c^3$ serves to lock the rod in its various adjusted positions. The upper reaches of the endless ribbons $c^1$ of the conveyor are straight or flat, as shown in Figure 1. The deflector plate 19 is connected to the central portion of the knife carrying arm 14 by way of hinges 124 so that when the arm is in its inoperative position it may be swung outwards for cleaning purposes (see Figure 8). A thumb screw 125 extends through a lug 126 on the arm 14 and operates releasably to clamp the deflector plate 19 in its operative position. The lug 126 is formed as an integral part of the arm 14 and is disposed between the hinges 124. The screw is adapted when tightened to bear against the central portion of the plate and when tightened to its fullest extent clamps the deflector plate in place. When the screw 125 is loosened the plate is released and hence may be then swung away from the arm 14. The upper or proximal portion of the deflector plate is parallel with the upper gauge plate 17 when the deflector plate is in its normal position. The lower or other portion of the plate extends inwards at an acute angle and is positioned in close proximity to the lug equipped knife carrying sleeve 82. The bottom margin of the deflector plate is bevelled, as shown in Figure 6, and is positioned in substantially contacting relation with the under side of the knife 16 and in close proximity to the cutting edge 86 of the knife. On the down or cutting stroke of the knife the slice as it is severed from the slab of bacon being cut engages the bevelled lower margin of the deflector plate and is deflected by such margin downwards onto the receiving end of the endless conveyor C. It is contemplated that the endless conveyor be driven during operation of the machine. As the endless conveyor is driven the slices are deflected onto the upper reach of the conveyor in "shingled" fashion. The portion of the deflector plate 19 which is next to the lower, bevelled, slice-stripping margin is so positioned that at the end of the down stroke of the arm 14 it engages the slices on the receiving end of the conveyor with slight downward pressure. It is flat, as shown in Figure 6, and hence operates to flatten the slices directly after they are deflected onto the receiving end of the conveyor. The bottom face of the slice flattening portion of the deflector plate is provided with a longitudinal series of laterally spaced flutes 127 and these serve to reduce any friction or drag on the slices when the latter are contacted by the fluted portion of the deflector plate. The parts of the plate which are disposed between the flutes constitute ribs or teeth 128 which are of V-shaped cross section and serve to prevent displacement of the slice being cut in a longitudinal direction with respect to the knife 16. A stop lug 129 is secured to the lower face of the fluted portion of the deflector plate. This lug is substantially aligned with the side wall of the trough 13 and in conjunction with the teeth 128 operates to prevent the slices from adhering to, and moving with, the knife 16 as they are severed from the slab being cut. By applying the lug to the deflector plate the slices of bacon on the conveyor are all aligned with one another as far as side edges are concerned.

Operation

When it is desired to use the machine a slab of bacon to be sliced is placed on the bottom wall 31 of the trough 13. As soon as the slab is released it moves downwards by gravity until the lower end strikes against the upper gauge plate 17. The shoes 35 and 36, as hereinbefore described, urge the slab against the trough side wall 32 and the shoe 37 holds the lower end of the slab in firm contact with the shearing bar 34. If it is desired to use or employ the follower block 55 the latter is swung over the trough and is urged downwards in order to bring the fork 59 into penetrating relation with the slab. As soon as the slab is in place the electric motor 69 is started. When current is supplied to the motor the knife carrying arm 14 is caused to oscillate. On the up stroke of the arm 14 the gauge plate 17 and the knife 16 slide out of engagement with the lower end of the slab and the slab moves forwards into abutment with the lower gauge plate 18. On the down stroke of the arm 14 the cutting edge 86 of the knife 16 penetrates and slices the lower end of the slab. During the down stroke the knife not only swings past the slab but also slides longitudinally in the direction of the pivot pin 61. Due to the combined swinging and sliding movements of the knife the slab is effectively and efficiently sliced and the slices are free from any so-called "strings." During each down stroke of the knife the resulting slice is stripped from the cutting edge of the knife by the bevelled lower margin of the deflector plate 19 and is directed or deflected downwards onto the receiving end of the conveyor C. If it is desired to decrease the thickness of the slices the operator of the machine turns the adjusting screws 112 so as to cause them to move upwards. When the screws are so turned the gauge plate 18 is caused to move closer to the knife 16. If it is desired to increase the thickness of the slices the adjusting screws are reversely rotated in order to cause the lower gauge plate 18 to move downwards away from the cutting edge 86 of the knife. When it is desired to sharpen the cutting edge of the knife as well as clean the knife and the gauge and deflector plates the operator, after stopping the machine, first turns by hand the pulley 74 until the main oscillatory arm 14 is swung upwards to its uppermost extent, that is, into a position wherein the lower end of the pivot pin 90 fits within the seat 99 at the upper end of the bracket 98. After this operation the nut 101 is tightened so as to clamp the lower end of the pin to the bracket. After tightening of the nut 101 the nut 97 is loosened so as to free or release the pin 90 from the bracket 94 on the plate 22 of the supporting structure 12. At the conclusion of this step the cotter pin 80 is removed from the upper end of the pivot pin 78. Thereafter the pivot pin is removed by grasping the handle 79 and shifting the pin axially in a downward direction. Upon removal of the pivot pin 78 the arm 14 is fully or completely released and may be manually swung by the operator into its inoperative position. As soon as the arm is in its inoperative position the operator releases the screws 109 and 125 and then swings the gauge and deflector plates into their open position. When the plates are in such position the knife 16 is accessible for sharpening and cleaning purposes and the plates are so disposed that they may be readily wiped or otherwise cleaned.

The herein described slicing machine is compact and effectively and efficiently fulfills its intended purpose. It is simple as far as design and construction are concerned and is characterized by the fact that the various operating parts are readily accessible for cleaning.

Whereas the machine has been described as being primarily designed or adapted to slice bacon in the form of frozen slabs it is to be understood that other meat products or articles may be sliced by the machine. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. A slicing machine comprising in combination a supporting structure having a trough associated therewith for feeding the material to be sliced, an elongated arm extending transversely across the discharge end of the trough and pivotally connected at one end thereof to the supporting structure so that it is capable of oscillating up and down past said discharge end of the trough, a bar type knife extending longitudinally of the arm and carried by the arm so that it is slidable lengthwise, means for oscillating the arm, and means for sliding the knife in one direction during the down stroke of the arm and in the opposite direction during the up stroke of the arm embodying a link extending normally at an acute angle to the knife and having one end thereof pivotally connected to said knife and its other end connected to the supporting structure so as to pivot about a fixed axis that is offset with respect to the pivotal connection between the arm and said supporting structure.

2. A slicing machine comprising in combination a supporting structure having a trough associated therewith for use in feeding the material to be sliced, an elongated arm pivotally connected at one end thereof to the supporting structure so that it may be swung back and forth between a normal operating position wherein it extends transversely across the discharge end of the trough and an inoperative position at one side of the discharge end of the trough, a bar type knife extending longitudinally of the arm and carried by the arm so that it is slidable lengthwise, means for oscillating the arm when it is in its operative position, and means for sliding the knife back and forth during oscillation of the arm consisting of a link extending normally at an acute angle to the knife and having one end thereof pivotally connected to said knife and its other end connected to the supporting structure so as to pivot about a fixed axis that is offset to the pivotal connection between the arm and the supporting structure, one of the pivots for the link being readily releasable in order that the arm may be freed for swinging into its inoperative position.

3. A slicing machine comprising in combination a supporting structure having a trough associated therewith for use in feeding the material to be sliced, an elongated arm pivotally connected at one end thereof to the supporting structure so that it may be swung back and forth between a normal operating position wherein it extends transversely across the discharge end of the trough and an inoperative position at one side of the discharge end of the trough, a bar type knife extending longitudinally of the arm and carried by the arm so that it is slidable lengthwise, means for oscillating the arm when it is in its operative position, means for reciprocating the knife during oscillation of the arm consisting of a link having one end thereof pivotally connected to the knife and its other end connected to the supporting structure by a releasable pivot in order that it may be freed from said supporting structure in connection with swinging of the arm into its inoperative position, and means for locking the link to the arm when the arm is in its said inoperative position.

4. A slicing machine comprising in combination a supporting structure having a trough associated therewith for feeding the material to be sliced, an elongated arm pivotally connected at one end thereof to the supporting structure so that it may be swung back and forth between a normal operating position wherein it extends transversely across the discharge end of the trough and an inoperative position at one side of the trough, a bar type knife extending longitudinally of the arm and carried by the arm so that it is slidable lengthwise, power means adapted to oscillate the arm when it is in its operative position and including a releasable connection between it and the arm whereby the arm may be disconnected or freed for swinging into its inoperative position, and means for sliding the knife back and forth during oscillation of the arm including a link extending between, and pivotally connected to, the supporting structure and the knife and having one of the pivots thereof releasable so as to free the arm for said swinging into its inoperative position.

5. In a slicing machine of the character described the combination of a trough for feeding the material to be sliced, an elongated arm extending transversely across the discharge end of the trough and pivoted at one end thereof so that it is capable of oscillating past said discharge end of the trough, a shaft of circular cross section extending longitudinally of the arm and carried by the arm so that it is slidable axially, a bar type knife fixed to, and extending longitudinally of, the shaft, means for oscillating the arm, means for sliding the shaft together with the knife back and forth during oscillation of the arm, and means for preventing turning of the knife about its axis during sliding movement thereof consisting of a pair of laterally spaced guide plates extending longitudinally of, and fixed to the arm, and an element connected to, and extending radially from, the shaft and having a shoe at its outer end fitting between, and engaging slidably, said plates.

6. A slicing machine comprising in combination a trough adapted to feed the material to be sliced and provided at its discharge end with a shearing bar, an elongated arm extending transversely across the discharge end of the trough and pivoted at one end thereof so that it is capable of oscillating past said one end of the trough, a shaft of circular cross section extending lengthwise of the arm and carried by the arm so that it is axially slidable, a bar type knife extending lengthwise of, and connected fixedly to, the shaft and adapted in connection with oscillation of the arm so to coact with the shearing bar or to slice the material as it is fed along the trough, means for oscillating the arm, means for sliding the shaft together with the knife back and forth during oscillation of the arm, and means for preventing turning of the shaft and knife about the axis of the shaft during sliding movement resulting from functioning of said sliding means consisting of a pair of laterally spaced guide plates extending longitudinally of, and fixed to, the arm and an element connected to, and extending radially from, the shaft and having its outer end fitting between said plates, said element being releasably and adjustably connected to the shaft so that the shaft may be rotatively adjusted about the axis thereof in order properly to position the knife with respect to said bar.

7. A slicing machine comprising in combination a supporting structure having a trough associated therewith for feeding the material to be sliced, an elongated arm pivotally connected at one end thereof to the supporting structure so that it may be swung up and down between a normal operating position wherein it extends transversely across the discharge end of the trough and an inoperative position at one side of the trough, and provided at said one end thereof with a radially or outwardly extending arm arranged so that it projects downwards when the arm is in its operative position, a slicing knife carried by the arm, power means adapted to oscillate the arm when it is in its said operative position and including a readily releasable or detachable connection between it and the arm whereby the arm may be disconnected or freed for swinging into its inoperative position, and an elongated helical type tension spring disposed beneath, and extending lengthwise of, said one end of the arm, having one end thereof anchored to the supporting structure and its other end connected to the outer end of the ear, and serving to balance the arm when it is in its operative position and also to urge the arm into its inoperative position upon release of the releasable connection.

8. A slicing machine comprising in combination a supporting structure having associated therewith a trough for feeding the material to be sliced, an elongated arm pivotally connected at one end thereof to the supporting structure so that it may be swung back and forth between a normal operating position wherein it extends transversely across the discharge end of the trough and an inoperative position at one side of the trough, a bar type slicing knife carried by, and extending longitudinally of, the arm, a gauge plate adapted to coact with the knife to control the depth of cut, hinged to the arm so that when the latter is in its inoperative position it may be swung at right angles to the plane of the knife into an open position for cleaning purposes, and having associated therewith readily releasable means for securing it in its normal or operative position, and means for oscillating the arm when it is in its said operative position.

9. A slicing machine comprising in combination a supporting structure having associated therewith a trough for feeding the material to be sliced, an elongated arm pivotally connected at one end thereof to the supporting structure so that it may be swung back and forth between a normal operating position wherein it extends transversely across the discharge end of the trough and an inoperative position at one side of the trough, a bar type slicing knife carried by, and extending longitudinally of the arm, a pair of gauge plates positioned one above the knife and one beneath the knife, hinged to the arm so that when the latter is in its inoperative position they may be swung at right angles to the plane of the knife into an open position for cleaning purposes, and having associated therewith readily releasable means for securing them in their normal or operative position, and means for oscillating the arm when it is in its operative position.

10. A slicing machine comprising in combination a supporting structure having associated therewith a trough for feeding the material to be sliced, an elongated arm pivotally connected at one end thereof to the supporting structure so that it may be swung back and forth between a normal operating position wherein it extends transversely across the discharge end of the trough and an inoperative position at one side of the trough, a bar type slicing knife carried by, and extending longitudinally of, the arm, a deflector plate on said arm adjacent the back face of the knife hinged to the arm so that when the latter is in its inoperative position it may be swung at right angles to the plane of the knife into an open position for cleaning purposes, and having associated therewith readily releasable means for securing it in its normal or operative position, and means for oscillating the arm when it is in its operative position.

11. A slicing machine comprising in combination a supporting structure having associated therewith a trough for feeding the material to be sliced, an elongated arm pivotally connected at one end thereof to the supporting structure so that it may be swung back and forth between a normal operating position wherein it extends transversely across the discharge end of the trough and an inoperative position at one side of the trough, a slicing knife carried by the arm, a pair of gauge plates positioned one above and one beneath the knife and hinged to one side of the arm so that when the latter is in its inoperative position they may be swung into an open position for cleaning purposes, a deflector plate positioned adjacent the back face of the knife and hinged to the other side of the arm so that it may be swung into an open position when the arm is in its said inoperative position, and means for oscillating the arm when it is in its operative position.

12. A slicing machine comprising in combination a supporting structure having a trough associated therewith for use in feeding the material to be sliced, an elongated arm extending transversely across the discharge end of the trough and pivoted at one end thereof to the supporting structure so that it is capable of oscillating past said discharge end of the trough, a bar type knife extending longitudinally of the arm and carried by the arm so that it is slidable lengthwise, power means for oscillating the arm, means for sliding the knife back and forth during oscillation of the arm consisting of a link having a pivot between one end thereof and the knife and a pivot between its other end and the supporting structure, and means for releasably locking the arm to the second mentioned pivot when the machine is not in use.

13. A slicing machine comprising in combination a supporting structure having a bracket mounted thereon, a trough associated with the structure for use in feeding the material to be sliced, an elongated arm provided with a bracket and connected pivotally at one end thereof to the supporting structure so that it may be swung back and forth between a normal operating position wherein it extends transversely across the discharge end of the trough and an inoperative position at one side of the trough, a bar type knife extending longitudinally of the arm and carried by the latter so that it is slidable lengthwise, means for oscillating the arm when it is in its operative position, and a knife controlling link having one end thereof pivotally connected to the knife and embodying at its other end a pivot pin connectable to either of said brackets or both.

JOSEPH FOLK.